Figure 1:
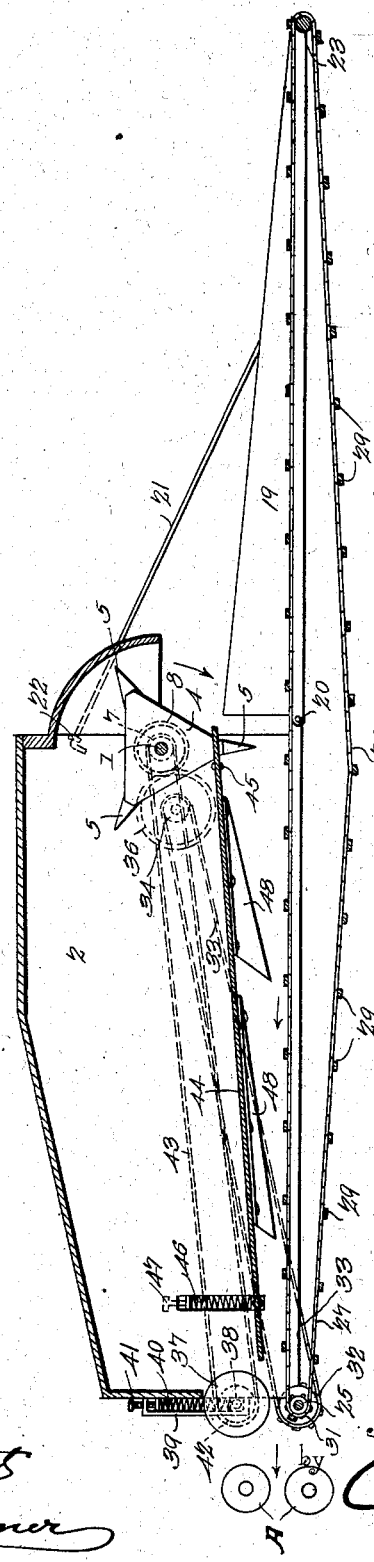

No. 729,739. PATENTED JUNE 2, 1903.
J. CROSBY.
BAND CUTTER AND FEEDER FOR CORN SHREDDING MACHINES.
APPLICATION FILED JULY 15, 1901.
NO MODEL. 2 SHEETS—SHEET 1.

Witnesses
Jesse Crosby, Inventor

No. 729,739. PATENTED JUNE 2, 1903.
J. CROSBY.
BAND CUTTER AND FEEDER FOR CORN SHREDDING MACHINES.
APPLICATION FILED JULY 15, 1901.
NO MODEL. 2 SHEETS—SHEET 2.
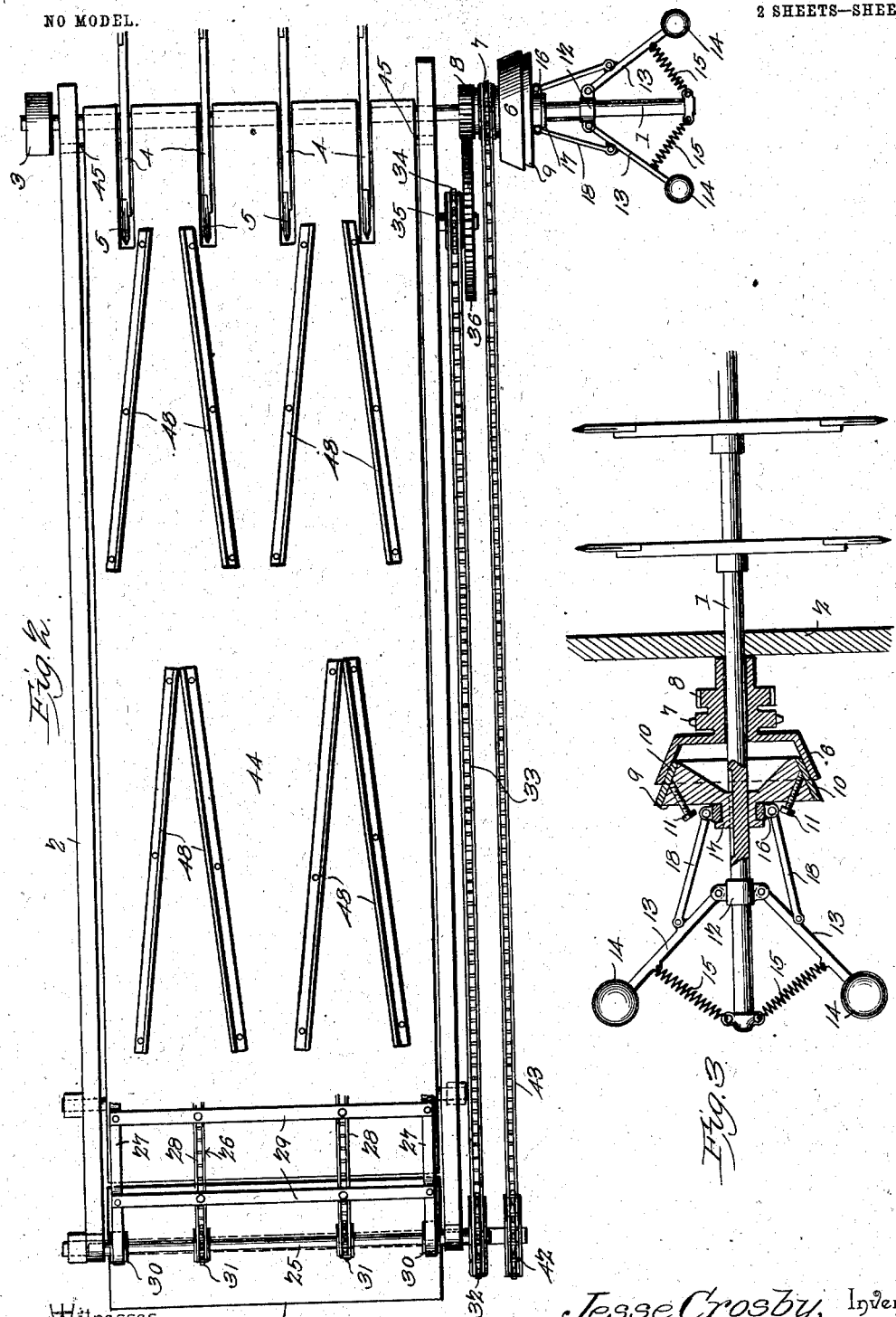
Witnesses
Jesse Crosby, Inventor
by
Attorneys No. 729,739. Patented June 2, 1903.

UNITED STATES PATENT OFFICE.

JESSE CROSBY, OF MADELIA, MINNESOTA.

BAND-CUTTER AND FEEDER FOR CORN-SHREDDING MACHINES.

SPECIFICATION forming part of Letters Patent No. 729,739, dated June 2, 1903.

Application filed July 15, 1901. Serial No. 68,361. (No model.)

*To all whom it may concern:*

Be it known that I, JESSE CROSBY, a citizen of the United States, residing at Madelia, in the county of Watonwan and State of Minnesota, have invented a new and useful Band-Cutter and Feeder for Corn-Shredding Machines, of which the following is a specification.

My invention is an improved band-cutter and feeder for corn-shredding machines especially adapted for feeding bundles of corn, cutting the cords or bands which bind the bundles, and spreading the corn after the same has been unbound to feed the same evenly to the feed-rolls of the shredding-machine; and my invention consists in the peculiar construction and combination of devices hereinafter fully set forth and claimed.

One object of my invention is to provide a presser-board which coöperates with the feed-carrier in spreading the unbound corn to feed the same evenly to the feed-rolls.

A further object of my invention is to provide improved spreaders on the lower side of the presser-board.

A further object of my invention is to effect improvements in the construction of a governor and in combination therewith of the feed-carrier and its coacting presser-roller to throw the feeding mechanism out of gear when the speed of the shredding mechanism falls below a predetermined rate and to bring the feeding mechanism into gear when the speed of the shredding mechanism reaches the required rate, and thus avoid choking the shredding mechanism.

In the accompanying drawings, Figure 1 is a vertical longitudinal sectional view of a band-cutter and feeder constructed in accordance with my invention. Fig. 2 is an inverted plan view of the same and partly a horizontal sectional view taken on a plane indicated by the line *a a* of Fig. 1. Fig. 3 is a detail transverse sectional view showing the governor mechanism.

A shaft 1 is transversely disposed in the front end of the casing 2 of the band-cutting and feeding mechanism and is journaled in bearings in the sides of said casing. At one end of the said shaft is a pulley 3, which in practice is connected to a pulley on the cylinder of the shredding-machine (not here shown) by an ordinary endless power-belt, whereby power is communicated to the shaft 1 from the cylinder of the shredding-machine. On the said shaft 1 are a series of disks 4, which are appropriately spaced apart and are here shown as of triangular form. The said disks are provided with band-cutting knives 5. A friction-clutch member 6 is loose on the shaft 1 on the side of the casing opposite the pulley 3. A sprocket-wheel 7 and spur gear-wheel 8 are also loose on the said shaft 1 and rotate with each other and with the friction-clutch member 6. A clutch member 9 is splined on the shaft 1, rotates therewith, and is adapted to move longitudinally on said shaft. Said clutch member 9 is provided with a series of removable friction-blocks 10 on its periphery, which friction-blocks are preferably made of wood, and each of the same may be adjusted by a set-screw 11 to compensate for wear. A collar 12 is fast on the shaft 1, and to the same are pivotally connected the inner ends of centrifugal arms 13. Said arms are provided at their outer ends with balls or weights 14 and are normally drawn toward the shaft 1 by springs 15. An annulus 16 engages a collar 17, with which the clutch member 9 is provided, and said annulus is connected to the said centrifugal arms by links 18. Normally by the action of the springs 15 and the centrifugal arms and link-bars the clutch member 9 is out of engagement with the clutch member 6, and hence the sprocket-wheels 7 and spur gear-wheel 8 are normally loose on the shaft 1; but when the said shaft 1 is speeded the centrifugal arms 13 move outwardly and engage the clutch member 9 frictionally with the clutch member 6, thereby locking the sprocket-wheel 7 and gear-wheel 8 to said shaft 1 for the purpose hereinafter described.

A frame-section 19 is hinged, as at 20, to the front end of the casing 2 at the lower side thereof and is adapted to be extended horizontally outwardly from said casing 2 or to be folded under the same. Rods 21 support the said frame-section 19 in the position shown in Fig. 1, the said rods being attached to the sides of the frame-section 19 and adapted to be hooked to the sides of the casing 2, as at 22. At the outer end of the said hinged frame-section 19 is a roller 23, which has its bearings in the sides of the said frame-section. A roller 24 is disposed transversely at the rear end of the casing 2 at the lower side thereof and is journaled in suitable bearings with which the said casing is provided. An endless traveling feed-carrier 26 connects the rollers 23 25 and comprises a pair of endless belts 27, which form the outer sides of said feed-carrier, endless chains 28, which are disposed between the said endless belts, and cross slats or bars 29, which are disposed transversely on said endless belts and endless chains and connect the same together. The said endless belts 27 operate on pulleys 30 on the roller-shaft 25, and said endless chains 28 operate on sprocket-wheels 31 on said roller-shaft. At one end of said roller-shaft is a sprocket-wheel 32, which is connected by an endless sprocket-chain 33 to a sprocket-wheel 34, that is journaled on a stub-shaft 35, which projects from one side of the casing 2. A spur-wheel 36 rotates with said sprocket-wheel 34 and is engaged by the spur-gear 8. Hence power is communicated from the band-cutter shaft 1 to the feed-carrier and the latter is caused to operate, as indicated by the arrow in Fig. 1.

A presser-roller 37 is journaled in vertically-movable bearings 38, which operate in vertical guideways 39 on the sides of the casing 2, at the rear end thereof. Hence said presser-roller is adapted to move vertically. The same is depressed by springs 40, the tension of which may be varied at will by screws 41, as shown in Fig. 1. The function of the said presser-roller is to bear downwardly on the corn on the feed-carrier and coöperate with the latter in delivering the corn to the feed-rollers A of the shredding mechanism, by which feed-rollers the corn is delivered and fed to the shredding mechanism. (Not shown.) The said presser-roller has a sprocket-wheel 42 at one end of its shaft. An endless sprocket-chain 43 connects said sprocket-wheels 42 to the sprocket-wheels 7 on the band-cutter shaft 1. Hence power is communicated from the said band-cutter shaft to the said presser-roller, as will be understood.

Over that portion of the feed-carrier which is in rear of the band-cutter shaft is disposed a presser-board 44, the front end of the same being supported, as at 45, against vertical movement, and the rear portion thereof being depressed by springs 46, which permit said presser-board to yield to pressure from the lower side, but normally maintain the presser-board in the position shown in Fig. 1. Adjusting-screws 47 are provided to vary the tension of the springs 46 at will. The bundles of corn thrown on the front portion of the feed-carrier are conveyed thereby under the band-cutting knives, and as the bands are cut by the knives the bundles of corn spread laterally on the feed-carrier, this being facilitated by the presser-board 44. In order to cause the corn to be spread evenly on the feed-carrier, and hence to be fed evenly to the feed-rolls A, I provide spreader-ribs 48 on the under side of the presser-board, which spreader-ribs are arranged, as shown in Figs. 1 and 2 of the drawings, in pairs, each pair of spreader-ribs diverging toward the rear end of the presser-board. The said presser-board is relatively fixed—that is to say, it cannot move endwise and does not partake of the movement of the feed-carrier. The front end of the presser-board is provided with a series of slots $44^a$, the front ends of which are open, and the rear sides of the band-cutting disks, which carry the band-cutting knives, are disposed in said slots, as clearly shown in the drawings, and hence the bundles are held under the presser-board while their bands are cut by said knives, the presser-board greatly facilitating the operation of the band-cutting knives, as will be understood.

The operation of my invention will be readily understood from the foregoing description and by reference to the drawings.

The band-cutting and feeding mechanisms are driven by power communicated thereto from the cylinder-shaft of the shredding-machine. In the event that the feeding mechanism conveys corn too rapidly to the shredding mechanism and the latter tends to choke the reduced speed of the shredding mechanism will effect a corresponding reduction in the speed of the shaft 1 and the centrifugal governor mechanism hereinbefore described will disengage the clutch member 9 from the clutch member 6, thereby permitting the sprocket-wheels 7 and gear-wheel 8 to remain idle on the shaft 1, and hence discontinue the operation of the feeding mechanism. As the shredding mechanism becomes cleared and the speed of its cylinder increases the consequent increased speed of the band-cutting shaft 1 will cause the governor mechanism to automatically put the feeding mechanism in gear. Hence my improved band-cutter and feeder is automatic in its operation and is adapted to feed the corn to the shredding mechanism with a rapidity equal to the capacity of the latter and without danger of choking the same.

Having thus described my invention, I claim—

1. In a band-cutter and feeder for corn-shredding machines, the combination of a shaft having band-cutting elements, means whereby it may be driven by power communicated thereto from the shredding mechanism, a friction-gear loose on said shaft, a sprocket-wheel 7 and gear 8, loose on said shaft and connected together and to the friction-gear, an endless traveling feed-carrier extending under the band-cutting elements and having a driving sprocket-wheel 42, an endless chain connecting the sprocket-wheels 7 and 42 together, a friction-gear splined on the band-cutter shaft and movable into and out of engagement with the loose friction-gear thereon, a centrifugal mechanism to automatically operate said splined friction-gear, a presser-roller disposed over the discharge portion of the feed-carrier, a gear 36 engaging gear 8, power connections between said gear 36 and said presser-roller, whereby the latter is driven, and means to spread the stalks on the feed-carrier, after the bands of the bundles have been cut and before the stalks reach the presser-roller, substantially as described.

2. In a machine of the class described, the combination of a feed-carrier forming an approximately plane upper surface, a band-cutter over the same, and a relatively fixed spring-depressed presser-board, in rear of the band-cutter, over and proximate to the upper surface of the feed-carrier and inclined rearwardly thereto, said presser having depending spreader-ribs on its lower side disposed in pairs one pair behind another, the spreader-ribs diverging rearwardly, substantially as described.

3. The combination of a feed-carrier forming an approximately plane upper surface, a band-cutter over the same, and a relatively fixed spring-depressed presser-board, in the rear of the band-cutter, over and proximate to the upper surface of the feed-carrier and inclined rearwardly thereto, said presser having depending spreader-ribs on its lower side disposed in forward and rearward groups with the ribs of the rearward groups spaced at a less interval than those of the forward groups, substantially as and for the purpose specified.

In testimony that I claim the foregoing as my own I have hereto affixed my signature in the presence of two witnesses.

JESSE CROSBY.

Witnesses:
EDWARD C. FARMER,
ELIZABETH M. PRICE.